US 6,659,244 B2

(12) United States Patent
Goodell

(10) Patent No.: US 6,659,244 B2
(45) Date of Patent: Dec. 9, 2003

(54) INTEGRATED FOOT CONTROL VALVE ACTUATOR

(75) Inventor: David J. Goodell, Beaverton, OR (US)

(73) Assignee: Bendix Commerical Vehicle Systems LLC, Elyria, OH (US)

(*) Notice: Subject to any disclaimer, the term of this patent is extended or adjusted under 35 U.S.C. 154(b) by 24 days.

(21) Appl. No.: 09/729,645

(22) Filed: Dec. 4, 2000

(65) Prior Publication Data

US 2002/0066628 A1 Jun. 6, 2002

(51) Int. Cl.[7] .................................................. B60T 11/00
(52) U.S. Cl. ....................................................... 188/353
(58) Field of Search .......................... 188/353; 303/52, 303/56, 50, 84, 7, 8, 9, 6.01, 40, 3 R, 3 H; 137/627.5

(56) References Cited

U.S. PATENT DOCUMENTS 3,265,447 A * 8/1966 Bueler ......................... 303/52
3,269,784 A    8/1966 Bueler
3,279,867 A   10/1966 Bueler
3,355,223 A * 11/1967 Klimek ........................ 303/52
3,359,043 A * 12/1967 Papin .......................... 303/52
4,679,594 A *  7/1987 Fogg ......................... 137/627.5
4,729,607 A *  3/1988 Johnson ...................... 303/52
5,443,306 A *  8/1995 Broome ........................ 303/3

FOREIGN PATENT DOCUMENTS

DE         2520356 A1    11/1976

* cited by examiner

Primary Examiner—Christopher P. Schwartz
Assistant Examiner—Melanie Torres

(57) ABSTRACT

A pneumatic actuator is integrated into a foot control valve. It includes a pneumatically activated piston that applies a force to the foot control valve primary piston which, in turn, applies the vehicle brake system. The piston is configured to allow the pedal or treadle actuated plunger to push through the pneumatic actuator and apply the brake system. This finds particular use as an add-on feature for pre-trip inspection systems, as a working brake system, etc.

6 Claims, 2 Drawing Sheets

INTEGRATED FOOT CONTROL VALVE ACTUATOR

BACKGROUND OF THE INVENTION

1. Field of Invention

This invention relates to a braking system, and more particularly to an apparatus and method for simplifying pre-trip pneumatic brake system inspections.

2. Description of Related Art

Truck drivers often conduct their own pre-trip inspection of the braking system and, in fact, many truck fleets require the driver to conduct such an inspection as a part of standard operating procedure. For example, the brakes must be applied and the operator conducts a walk around inspection of the vehicle to be sure that all the brakes are properly applied. It is evident when the slack adjustors have moved forward that the brakes are properly applied. In addition, the vehicle operator listens for any audible leaks, checks operation of the stop lights, etc. as a part of the pre-trip inspection.

One manner of conducting the pre-trip inspection is to have a person sit in the cab and depress a foot pedal/treadle while the second person or operator conducts the manual walk-around inspection of the vehicle. This, of course, requires a second person to be present to complete the pre-trip inspection, at least with regard to application of the brakes. Another alternative is to add substantial hardware to the brake system thereby allowing the driver to apply the brakes and then exit the vehicle to conduct an inspection. For example, a complex system using a control valve on the vehicle dash and double check valves in the brake system results in considerable complexity and cost. The additional hardware allows the whole system to interrupt and apply the brakes, although not in a simplified, cost effective manner.

In addition, a need exists for other systems that can apply the signal from an easy control device. For example, a refuse truck could benefit from the use of a work brake where the air actuation system of the foot control valve is operated at a reduced pressure level. A bus door interlock system are other potential uses of an integrated foot control valve actuator.

A need exists for a simplified system and method of reducing the complexity of the pre-trip service inspection in a manner that does not adversely impact on the remaining components of the brake system in a commercially viable manner.

SUMMARY OF THE INVENTION

The present invention relates to providing an actuator between a foot pedal or treadle and the foot control valve.

The actuator can be easily actuated with a low capacity control signal.

A preferred form of actuator is a push through plunger that transfers forces from the depression of the foot pedal/treadle to the primary or top piston of the foot control valve and thus allows the foot pedal and control valve to operate in a conventional fashion. In addition, a control port is associated with a push through plunger to independently actuate the foot control valve via a pressure control signal and without using the foot pedal/treadle.

A primary advantage of the invention resides in the simple, low capacity two-way control valve or electrical solenoid to actuate the standard brake control.

Still another advantage resides in the reduced installation time.

Potential leakage points are also minimized with this simplified system.

Overall system complexity is substantially reduced, while permitting the operator to apply the brake system without depressing the foot pedal or treadle.

Still other advantages or benefits of the invention will become apparent to one skilled in the art upon a reading and understanding of the following detailed description.

BRIEF DESCRIPTION OF THE DRAWINGS

The invention may take physical form in certain parts and arrangements of parts, preferred embodiments of which will be described in detail in the specification and illustrated in the accompanying drawings.

DETAILED DESCRIPTION OF THE PREFERRED EMBODIMENTS

Figure 1:
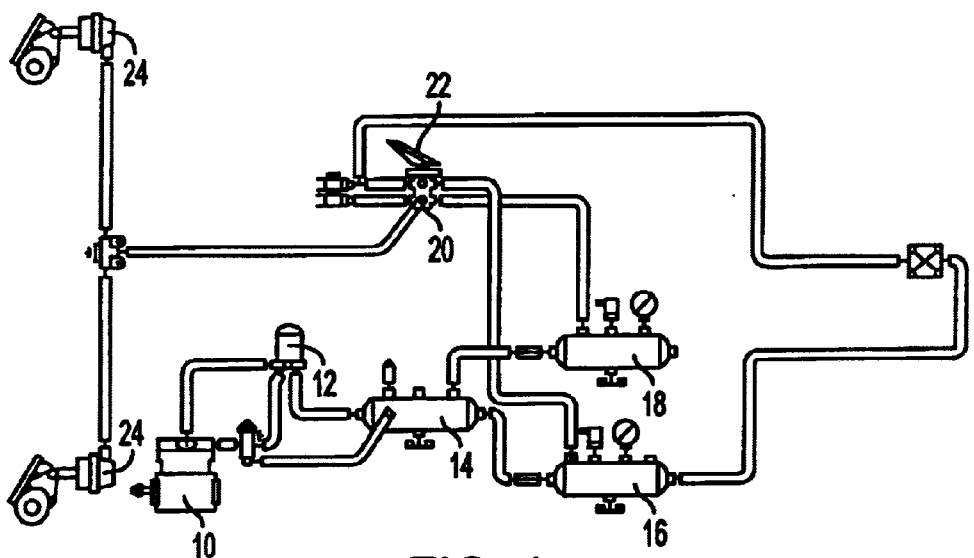
FIG. 1 is a schematic representation of a typical brake system.

FIG. 1 schematically illustrates a dual brake valve arrangement that includes separate supply and delivery circuits for service or primary and secondary braking. A compressor 10 provides pressurized air through an air dryer 12 to a supply reservoir 14. First and second service reservoirs 16, 18 store a ready supply of pressurized air for the pneumatic braking system. Particularly, a dual brake valve 20 is associated with a foot pedal/treadle 22 to supply pressurized air to brake chambers 24 associated with the wheels (only two shown). As is well known in the art, separate supply and delivery circuits are provided for service and secondary braking. The primary circuit portion is mechanically operated through the action of the treadle/pedal and an associated plunger. The secondary circuit normally operates similarly to a relay valve with control air delivered from the primary circuit. If, however, the primary supply fails, a secondary inlet valve is mechanically opened by a push through mechanical force from the driver's foot via the treadle/pedal, plunger, and primary piston.

Figure 2:
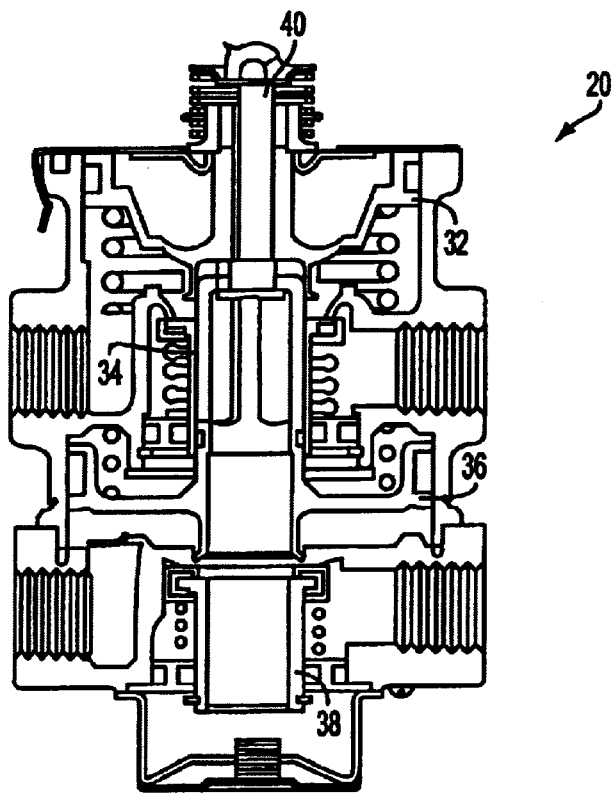
FIG. 2 is a longitudinal cross-section through a conventional foot control valve.

A conventional foot control valve of this type is illustrated in FIG. 2. The structure and operation of such a valve is well known to those in the art so that only selected details will be described herein for purposes of brevity.

The foot control valve 20 includes primary piston 32 and the primary inlet and exhaust valve assembly 34. In addition, a secondary, or relay, piston 36 is operatively associated with a secondary inlet and exhaust valve assembly 38 to selectively control the delivery and exhaust of pressurized air in the brake system. Again, details of such a conventional foot pedal and dual brake valve assembly are well known and are commercially available from the assignee of the subject application as an E-6 or E-8P brake valve.

When the brake pedal/treadle is depressed, a plunger extending therefrom exerts a force by column loading stem 40 of the primary piston. The primary piston, in turn, acts on an inlet/exhaust valve assembly to selectively deliver air to delivery ports of a valve and thus actuate or apply air to the brake system.

Figure 3:
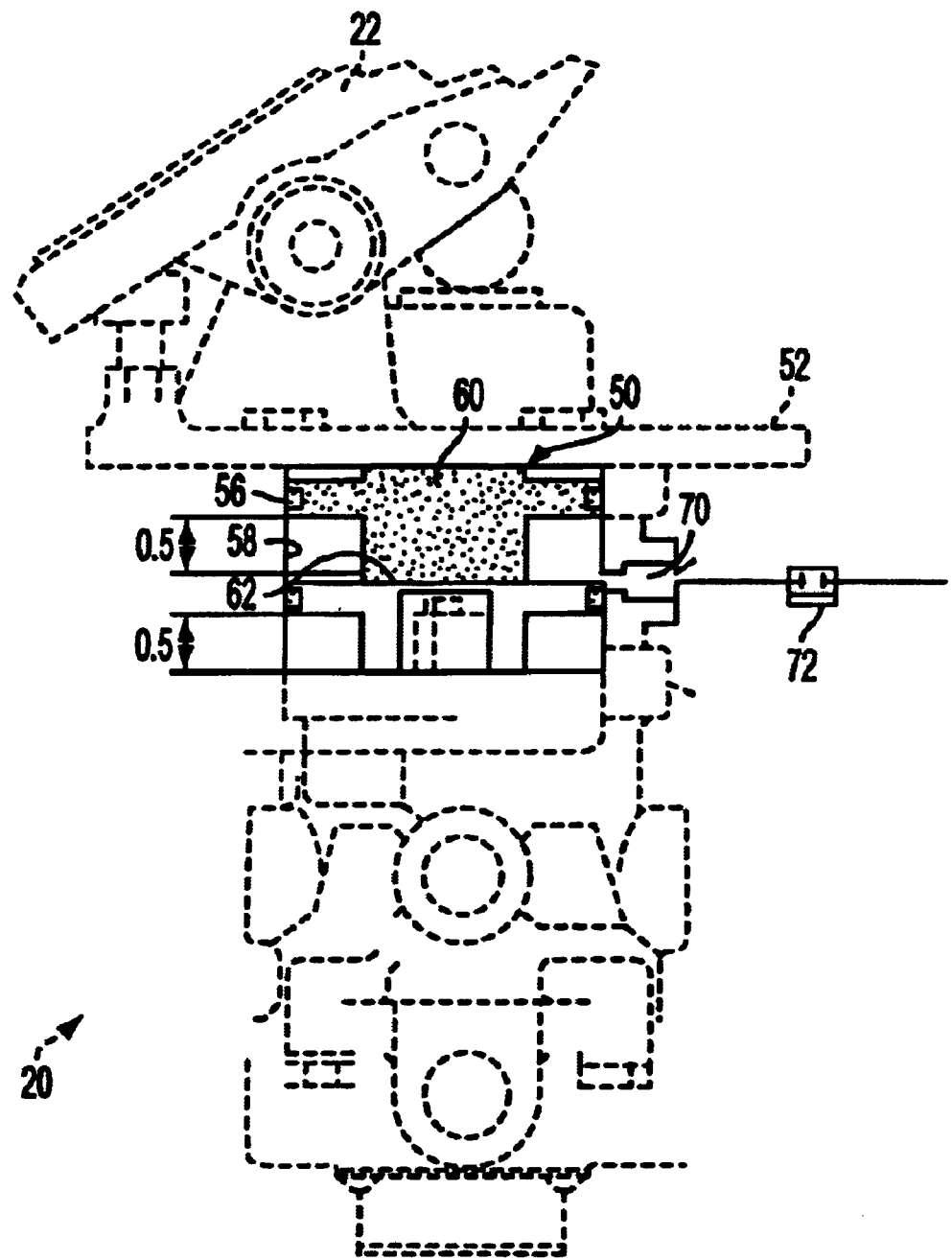
FIG. 3 is a cross-sectional view of the subject invention.

Under selected circumstances as described in the Background, it is desirable to actuate the brakes without depressing the foot pedal/treadle. In accordance with the teachings of the subject invention, and as more particularly illustrated in FIG. 3, a pneumatic actuator 50 is interposed between a foot control valve 20 and the foot pedal/treadle 22. The primary piston of the foot control valve is illustrated and thus an extension in the housing or a separate housing is sandwiched or interposed between the foot control valve and a base plate 52. The pneumatic actuator is preferably a push through plunger, such as an O-ring 56, that slidably and sealingly engages internal wall 58 of the housing.

A first or upper end 60 of the plunger extends toward the foot pedal and a second end 62 extends outwardly from the piston for abutting engagement with the primary piston of the foot control valve. In this manner, any depression of the foot pedal pushes through or actuates the primary piston of the foot control valve. The treadle plunger force pushes through for normal service application of the brakes via the foot pedal.

Control port 70 is provided in the wall of the housing and communicates with a lower face of the plunger, as well as the upper face of the primary piston. Upon introduction of a control pressure to the port via two-way valve 72, the plunger 50 remains in the position illustrated in FIG. 3 while the pressurized air urges the primary piston of the foot control valve into an actuated state, i.e., downwardly as shown, to apply the system brakes. In this manner, a low capacity pneumatic control signal simulates the same action as the depression of the foot pedal, i.e., actuating or applying air to the entire brake system simultaneously. This is accomplished without making a foot control application, but rather actuating a switch on the dash or a solenoid (represented by two-way valve 72) and provide the same effect as if the operator applies the brakes through the foot pedal. The brakes at each wheel are applied, and compressed air is also provided to the trailer. The vehicle operator can thus conduct a pre-trip inspection without requiring a second person to actually depress the foot pedal.

In the example where the pre-trip inspection is desired, approximately 85 psi control pressure is provided to the primary piston of the foot control valve. The present invention contemplates, however, other pressure levels where additional application may be desired. For example, use as a work brake such as in a refuse truck that provides frequent stops, would allow a pressure level of approximately 45 psi to be used. In still another system, the pneumatic actuator could be used with a bus door interlock. In other words, control pressure would be provided via port 70 to actuate the brakes in response to opening of a bus door. This assures that the brakes are applied and thus does not rely on the operator to maintain the foot pedal in a depressed state while the door is open.

Still other potential uses are as an integral double-check for dual control functions such as pre-trip inspection and radar brake. A pressure regulator can integrated into the system where the piston 50 sized to provide a desired delivery pressure for the intended use. In still another arrangement, dual pistons could be provided in which separate actuation in a dual cab truck may be provided by controlling the right side cab brake valve.

The two-way valve can also be made responsive to other control systems of the vehicle. For example, the valve 72 may be made responsive to the park control system so that it is operative when the park brake is applied. These additional features are similar to commercially available concepts used in other brake systems.

The invention has been described with reference to the preferred embodiments. Obviously, modifications and alterations will occur to others upon a reading and understanding of the present invention. It is intended to include all such modifications and alterations insofar as they come within the scope of the appended claims or the equivalents thereof.

Having thus described the invention, it is claimed:

1. A foot control valve assembly for operating a vehicle brake system that includes brake chambers associated with wheels of the associated vehicle comprising:

a foot pedal/treadle adapted to be selectively actuated by a vehicle operator;

a first control valve operatively associated with the foot pedal/treadle for selectively delivering fluid pressure to and exhausting fluid pressure from brake chambers in response to actuation and deactuation of the foot pedal/treadle;

an actuator operatively interposed between the foot pedal/treadle and the first control valve for activating the control valve independently of the foot pedal/treadle;

a port that communicates between the actuator and the control valve, said port being adapted to receive the fluid pressure; and a second control valve that controls delivery of said pressure to the port;

wherein the actuator activates the first control valve in response to said delivery of fluid pressure to the port.

2. The foot control valve assembly of claim 1 wherein the actuator is a pneumatic actuator.

3. The foot control valve assembly of claim 1 wherein the actuator is a push through plunger.

4. The foot control valve assembly of claim 1 wherein the actuator includes a first end dimensioned for operative engagement with the foot pedal/treadle and a second end dimensioned for operative engagement with the foot control valve in the absence of a control signal.

5. The foot control valve assembly of claim 1 wherein the actuator is a piston received in a housing that contains the control valve.

6. A foot control valve assembly for operating a vehicle brake system that includes brake chambers associated with wheels of the associated vehicle comprising:

a foot pedal/treadle adapted to be selectively actuated by a vehicle operator;

a first control valve operatively associated with the foot pedal/treadle for selectively delivering fluid pressure to and exhausting fluid pressure from brake chambers in response to actuation and deactuation of the foot pedal/treadle;

an actuator operatively interposed between the foot pedal/treadle and the first control valve for activating the control valve independently of the foot pedal/treadle;

a port that communicates between the actuator and the control valve, said port being adapted to receive the fluid pressure; and a second control valve that controls delivery of said pressure to the port;

wherein the actuator activates the first control valve in response to said delivery of fluid pressure to the port; and wherein the actuator includes a sliding seal that cooperates with a housing wall.

* * * * *

UNITED STATES PATENT AND TRADEMARK OFFICE
CERTIFICATE OF CORRECTION

PATENT NO. : 6,659,244 B2
DATED : December 9, 2003
INVENTOR(S) : David J. Goodell It is certified that error appears in the above-identified patent and that said Letters Patent is hereby corrected as shown below:

Column 3,
Line 52, please delete "can integrated" and insert -- can be integrated --.

Signed and Sealed this

Twenty-fourth Day of February, 2004

JON W. DUDAS
*Acting Director of the United States Patent and Trademark Office*